US006674356B2

(12) United States Patent
Naito et al.

(10) Patent No.: US 6,674,356 B2
(45) Date of Patent: Jan. 6, 2004

(54) FLYBACK TRANSFORMER

(75) Inventors: Kenji Naito, Kyoto-fu (JP); Hisashi Takiguchi, Kyoto-fu (JP); Masaru Omura, Kyoto-fu (JP); Tadao Nagai, Kyoto-fu (JP); Masahiko Kitamoto, Kyoto-fu (JP); Tsuyoshi Umemoto, Kyoto-fu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 4 days.

(21) Appl. No.: 09/928,823

(22) Filed: Aug. 13, 2001

(65) Prior Publication Data
US 2002/0074956 A1 Jun. 20, 2002

(30) Foreign Application Priority Data
Aug. 31, 2000 (JP) ........................................ 2000-262842

(51) Int. Cl.[7] ............................................... H01F 27/24
(52) U.S. Cl. ......................................... 336/212; 363/20
(58) Field of Search ............................ 363/21.12, 21.09, 363/21.17, 21.18, 20, 21.1; 336/212

(56) References Cited

U.S. PATENT DOCUMENTS

| 3,700,959 | A | * | 10/1972 | Sakurai ....................... 315/411 |
| 4,823,248 | A | * | 4/1989 | Ikeuchi et al. ................. 363/20 |
| 5,317,155 | A | * | 5/1994 | King ........................... 250/324 |
| 5,828,557 | A | * | 10/1998 | Sugawara et al. ............. 363/20 |
| 6,142,130 | A | * | 11/2000 | Ward ........................... 123/606 |
| 6,385,056 | B1 | * | 5/2002 | Gucyski ........................ 363/15 |

* cited by examiner

Primary Examiner—Anh Mai
(74) Attorney, Agent, or Firm—Keating & Bennett, LLP

(57) ABSTRACT

The number of layers of a secondary winding of a flyback transformer for use in a PWM controlled high-tension voltage generator is increased to six or higher. The distributed capacitance of the flyback transformer is thus decreased, the frequency of ringing is increased, and the pulse width of a flyback pulse is narrowed. The timing of the on-operation of a control FET is expedited, and the input current to the flyback transformer is lowered. A compact and power-saving flyback transformer thus results.

16 Claims, 7 Drawing Sheets

SECONDARY WINDING

50

SECONDARY WINDING

FLYBACK TRANSFORMER

BACKGROUND OF THE INVENTION

1. Field of the Invention

The present invention relates to flyback transformers and, more particularly, to a flyback transformer used in a PWM (Pulse Width Modulation) controlled voltage generator circuit for providing a high voltage to a cathode ray tube.

2. Description of the Related Art

FIG. 1 is a circuit diagram showing a high voltage generator circuit including a flyback transformer and which is the motivation for the development of the present invention. The anode of a diode 14 is connected to the primary winding of a flyback transformer 12 for use in a high voltage generator circuit 10 while the cathode of the diode 14 is connected to the drain of an FET (Field-Effect Transistor) 16 functioning as a switching element. The source of the FET 16 is connected to one end of a resistor 18 and the other end of the resistor 18 is grounded. A diode 20 is connected in parallel with the serial circuit of the diode 14, the FET 16, and the resistor 18. The cathode of the diode 20 is connected to the anode of the diode 14, while the anode of the diode 20 is grounded.

The serial connection of a resonance capacitor 22 and a diode 24 is connected in parallel with the diode 20. One end of the resonance capacitor 22 is connected to the anode of the diode 14, while the other end of the resonance capacitor 22 is connected to the cathode of the diode 24. The anode of the diode 24 is grounded. The junction of the resonance capacitor 22 and the diode 24 is connected to the anode of another diode 26, and the cathode of the diode 26 is connected to the primary winding of the flyback transformer 12 through a ringing suppressing circuit 28. The ringing suppressing circuit 28 comprises a capacitor 30, a resistor 32, and an inductor 34. A power supply +B is connected to the junction between the diode 26 and the ringing suppressing circuit 28. The junction between the diode 26 and the ringing suppressing circuit 28 is grounded through a capacitor 36 and a capacitor 38.

A signal for controlling the FET 16 in an on and off operation is fed to a gate of the FET 16 from a PWM (Pulse Width Modulation) control circuit 40. The control PWM circuit 40 receives a voltage which is obtained by voltage dividing the output voltage across the secondary winding of the flyback transformer 12. The control signal for controlling the FET 16 is formed based on the divided voltage and an input horizontal drive voltage. The junction of the FET 16 and the resistor 18 is connected to a protective circuit in the PWM 40, and an excessive current flowing through the circuit is detected by the protective circuit.

FIG. 2 show waveforms of voltages at representative points of the high voltage generator circuit 10. As shown, FIG. 2(a) shows a waveform of a signal for controlling the FET 16, and FIG. 2(b) shows a waveform of the voltage at point A in FIG. 1. FIG. 2(c) shows a waveform of a current flowing in the primary winding of the flyback transformer 12. When the FET 16 is turned on at $t_0$, a current flows from the power supply +B through the primary winding of the flyback transformer 12, the diode 14, the FET 16, and the resistor 18. The primary winding of the flyback transformer 12 stores electromagnetic energy when this current flows.

When the FET 16 is turned off at time $t_1$, a current flows from the primary winding of the flyback transformer 12 through the resonance capacitor 22, and the diode 26, and the primary winding of the flyback transformer 12 and the resonance capacitor 22 starts resonating, thereby generating a flyback pulse as shown in FIG. 2(b). The flyback pulse is maximized at the moment the electromagnetic energy stored in the flyback transformer is entirely converted into electrostatic energy in the resonance capacitor 22.

When the electromagnetic energy stored in the primary winding of the flyback transformer 12 is entirely transferred to the resonance capacitor 22, a reverse currents flows through a path along the diode 24, the resonance capacitor 22, and the primary winding of the flyback transformer 12. The electrostatic energy in the resonance capacitor 22 is transformed back into electrostatic energy in the primary winding of the flyback transformer 12. Charge stored in a stray capacitance of the FET 16 is blocked by the diode 14, and does not flow into the primary winding of the flyback transformer 12.

The voltage at point A returns to zero at time $t_2$ when the flyback pulse ends. The diode 20 is turned on, permitting a current to flow from ground to the primary winding of the flyback transformer 12. The voltage at point A rises when this current flows, and reaches the voltage of the power supply +B. At time $t_3$, the diode 20 is turned off, and the current becomes zero. A current from the power supply +B attempts to flow into the resonance capacitor 22, but a current prevention clamping circuit comprising the diodes 24 and 26 clamps the voltage across the resonance capacitor 22 to the voltage of the power supply +B. No current flows from the primary winding of the flyback transformer 12 to the resonance capacitor 22. When the FET 16 is turned on at time $t_4$, a current flows from the power supply +B to the primary winding of the flyback transformer 12, and the state of the circuit is the same as that at time $t_0$. The high voltage generator circuit functions repeating the above-referenced operation. The flyback transformer 12 raises the flyback pulse in voltage level, and provides a high voltage from the secondary winding thereof.

When the current drops to zero at time $t_3$, resonance takes place between the primary winding of the flyback transformer 12 and capacitance of the circuit including the stray capacity present in the FET 16. Ringing is thus generated from time $t_3$ to time $t_4$. The ringing suppressing circuit 28 is used to control ringing.

In the high-tension generator circuit 10, inductance Lp of the primary winding of the flyback transformer 12 satisfies the following condition:

$$Lp \leq Eb \times Ts/Ipp$$

where Eb is the voltage of the power supply +B, Ts is a duration of time from the end of the flyback pulse to the start of the next flyback pulse, and Ipp is an input current to the flyback transformer 12. Under this condition, the input current Ipp must meet the permissible current of the FET 16. The conventional flyback transformer 12 must satisfy these conditions and is designed to provide a required output voltage from the secondary winding thereof.

Magnetic flux density Bmax generated in the core of the flyback transformer 12 is Bmax=Lp×Ipp/N1×S, where N1 is the number of the primary winding coils, and S is the cross-sectional area of the core of the primary winding. Given a constant voltage Eb of the power supply +B, the input current Ipp is maintained low, the core is reduced in size, and the flyback transformer 12 is made compact. A lower input current Ipp leads to a lower power consumption.

SUMMARY OF THE INVENTION

Accordingly, it is an object of the present invention to provide a compact and low-power consumption flyback transformer which reduces an input current flowing thereinto.

A flyback transformer of the present invention for use in a PWM controlled high voltage generator circuit, includes a layer-wound secondary winding having the number of layers equal to or larger than six.

In a preferred embodiment, a diode is configured with the cathode thereof connected to one end of the secondary winding and with the anode thereof grounded.

The flyback transformer is preferably used in a PWM controlled high voltage generator circuit having an operation frequency of 70 kHz or higher.

The number of turns of the secondary winding may be not more than 2500.

Given the same number of winding turns, an increase in the number of layers of layer-wound secondary winding narrows the width across the secondary winding and reduces distributed capacitance of the flyback transformer. As distributed capacitance becomes lower, the frequency of ringing becomes higher, and the pulse width of the flyback pulse becomes narrower. This arrangement expedites the timing of stopping the ringing, thereby lengthening the on-time of the switching element. As the on-time of the switching element is lengthened, the gradient of the waveform of a current flowing through the primary winding of the flyback transformer is reduced, and the input current Ipp is also reduced.

In a flyback transformer circuit in which a diode is connected between one end of the secondary winding and ground (D0 diode method), an alternating current zero point which is grounded in terms of alternating current occurs approximately at the center of the secondary winding. Opposite pulses of negative and positive occur in the vicinity of the alternating current zero point. The alternating current zero point is determined by a distributed capacitance between the primary winding and the secondary winding, and a distributed capacitance between the winding and a ground area. Since the distributed capacitance changes depending on the separation between each of the windings and the ground area, the alternating current zero point is generated at a position offset from the center of the winding.

If the winding width is narrowed by increasing the number of layers of layer winding in the flyback transformer operating on the D0 switching method, the separation between each of the windings and the ground area becomes small, and the alternating current zero point approaches the center of the winding. In this way, the winding widths of portions of the winding which generates positive and negative pulses become close to each other, and the resonance frequencies of the positive pulse and the negative pulse become close, thereby reducing loss involved in resonance.

These and other objects, features and advantages will become apparent from the discussion of the following embodiments of the present invention and the accompanying drawings.

BRIEF DESCRIPTION OF THE DRAWING(S)

Figure 7:
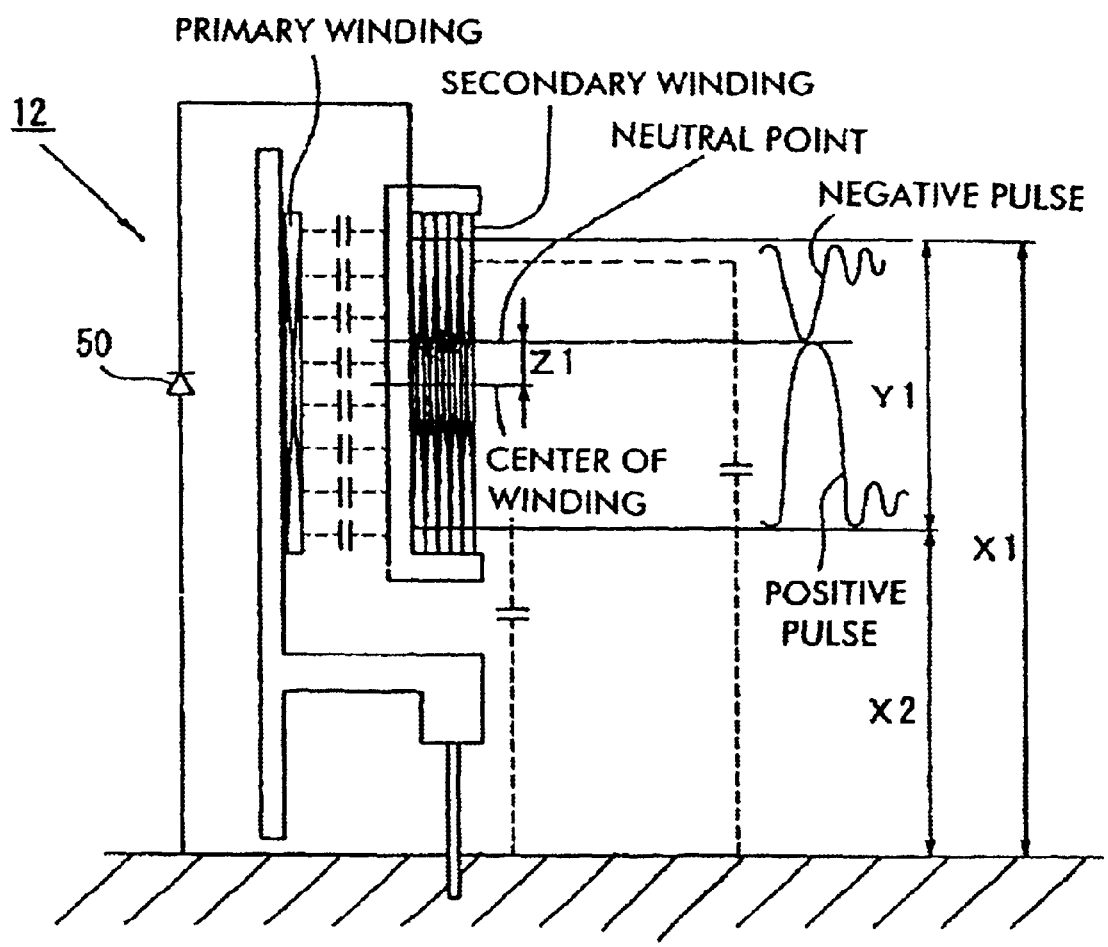
Figure 8:
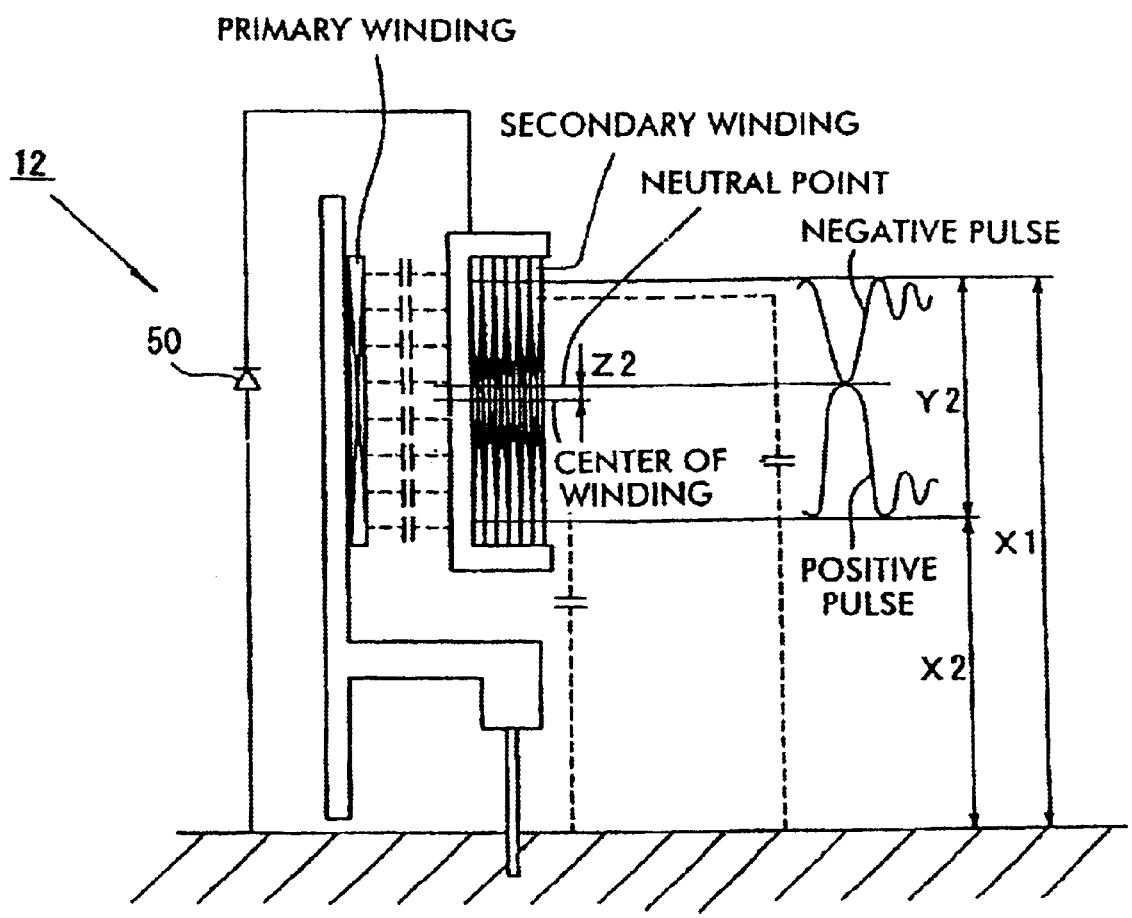

FIG. 7 is a circuit diagram showing one side of the flyback transformer, which is cut into half to show the positional relationship of the winding of the flyback transformer employing the D0 diode method; and FIG. 8 is a circuit diagram showing one side of the flyback transformer, which is cut into half to show the positional relationship of the winding when the number of layers of the secondary winding of the flyback transformer employing the D0 diode method is increased.

DETAILED DESCRIPTION OF EMBODIMENTS OF THE INVENTION

Figure 1:
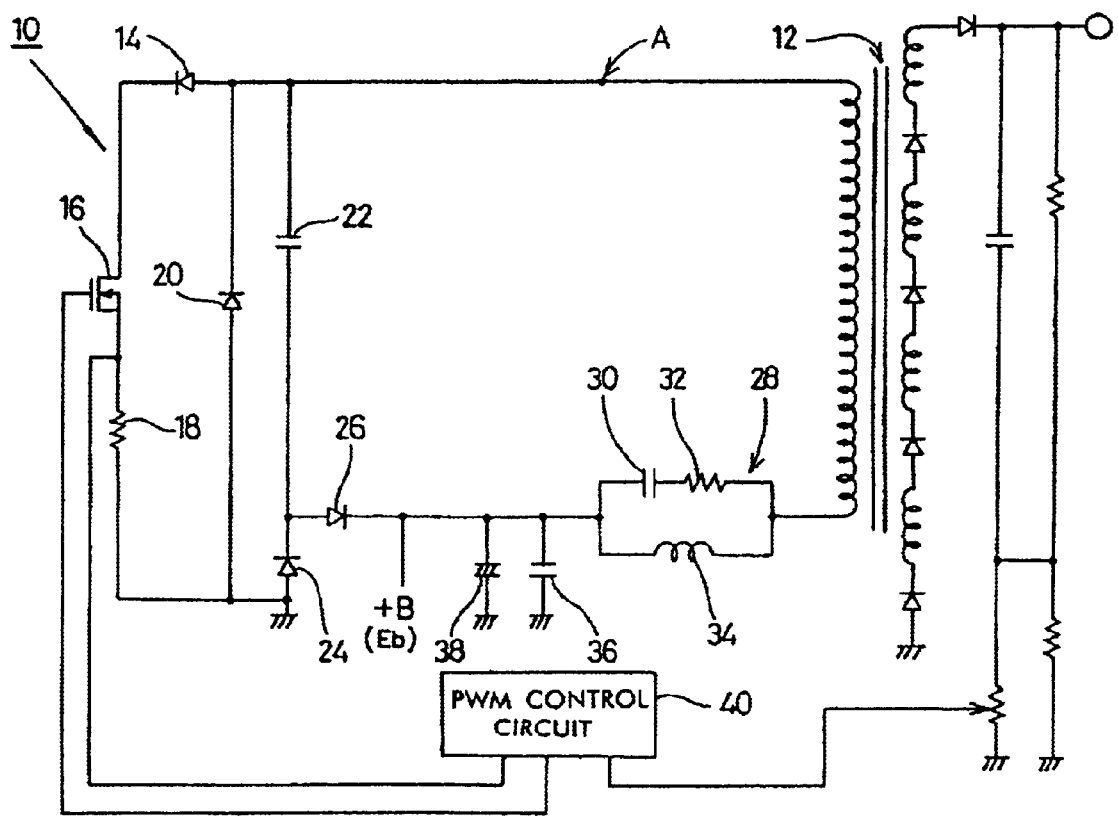
FIG. 1 is a circuit diagram showing a high voltage generator circuit including a flyback transformer, which is the background of the development of the present invention.

Referring to FIG. 1, a flyback transformer 12 in a high voltage generator circuit 10 typically includes a layer-wound secondary winding of five or less layers.

No consideration is given to the relationship between the number of layers and the size of the flyback transformer 12. The inventors of this invention have studied the relationship between the number of layers of the secondary winding of the flyback transformer 12 and the size of the flyback transformer 12, and have found that the size of the flyback transformer 12 is reduced by increasing the number of layers of the secondary winding. A flyback transformer 12 having five layers of secondary winding is compared with a flyback transformer 12 having six layers of secondary winding.

Figure 2A:
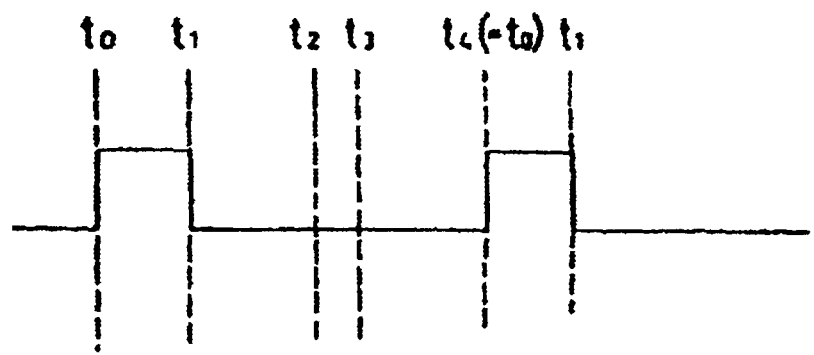
FIG. 2($a$) shows a waveform of a control signal for controlling an FET, FIG. 2($b$) shows a waveform of a voltage at point A of FIG. 1, and FIG. 2($c$) shows a waveform of a current flowing through a primary winding of the flyback transformer of FIG. 1.
Figure 2B:
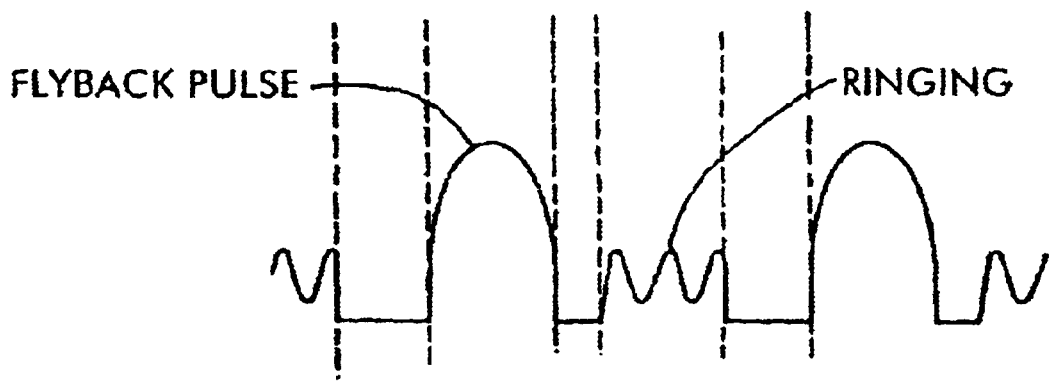
Figure 2C:
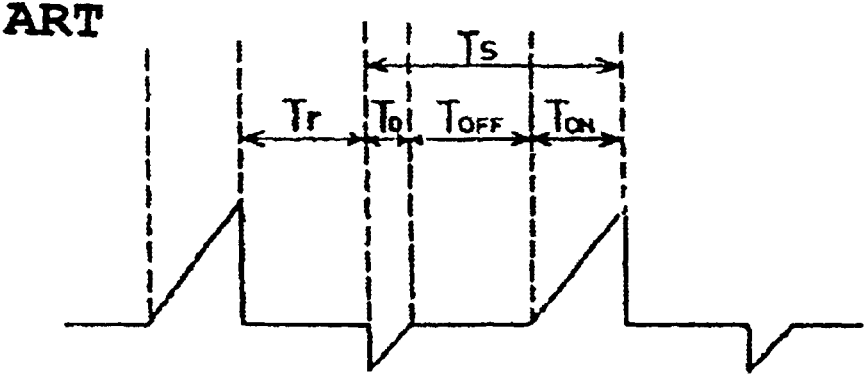
Figure 3:
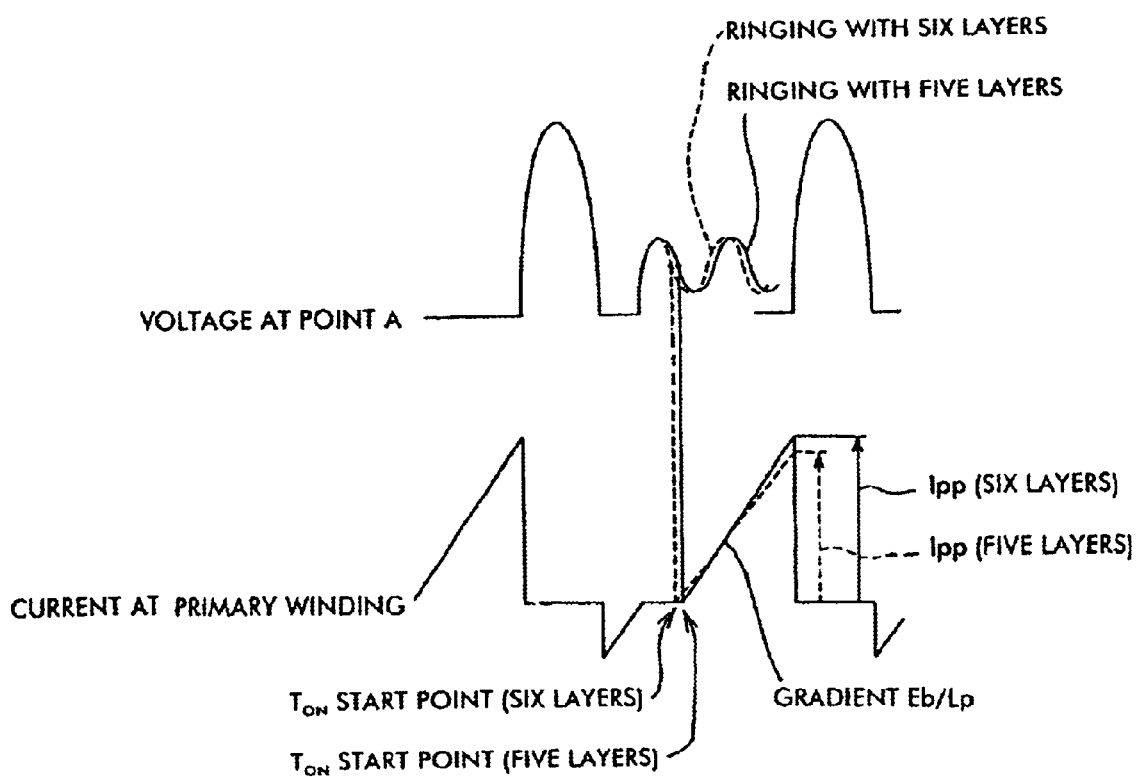
FIG. 3 is a waveform diagram showing the relationship between the start of $T_{ON}$ at the moment the frequency of ringing becomes high, and a flowing current.

In waveform diagrams shown in FIG. 2, the maximum permissible input current Ipp is expressed as follows:

$$Ipp = Eb(T_D + T_{OFF} + T_{ON})/Lp$$

where Tr is a flyback period until the flyback pulse returns to zero, $T_D$ is on-time of the diode 20. $T_{OFF}$ is a duration of time from when the diode 20 is turned off to when the FET 16 is turned on, $T_{ON}$ is on-time of the FET 16, and where $T_H = Tr + T_D + T_{OFF} + T_{ON}$ holds. Given a constant voltage Eb of the power supply +B, Lp is $Lp < Eb(T_D + T_{OFF} + T_{NO})/IPP$. The frequency of ringing is determined by the distributed capacitance of the flyback transformer 12.

When the number of layers of the secondary winding of the flyback transformer 12 is five, the value of Lp is determined taking into consideration the start of the on-time $T_{ON}$ set up at one point of the waveform of the ringing having a frequency of $f_5$. The height Ipp is determined from $Ipp = Eb \times T_{ON}/Lp$. The start of the on time $T_{ON}$ is determined taking into consideration conditions of oscillation of an equivalent circuit, such as one peak of the oscillation. Given the same number of secondary winding turns, the flyback transformer 12 having six layers of secondary winding has a winding width narrower than that of the flyback transformer 12 having five layers of secondary winding, and has a smaller distributed capacitance. The frequency $f_6$ of ringing at the six layers of secondary winding is thus higher than the frequency $f_5$ of the five layers of secondary winding.

The start of the on-time $T_{ON}$ at the six layers of secondary winding may be compared with the start of the on-time $T_{ON}$ at the five layers of secondary winding. The start of the on-time $T_{ON}$ of the six layers comes earlier because the frequency $f_6$ of ringing at the six layers is higher than the frequency $f_5$ of ringing at the five layers. The inductance Lp is adjusted to expedite the start of the on-time $T_{ON}$. The gradient Eb/Lp of the current waveform becomes smaller while the current Ipp is reduced.

Generally, magnetic flux density Bmax of the core in use of the flyback transformer is Bmax=Lp×Ipp/N1×S, where N1 is the number of turns of primary winding and S is the cross sectional area of the core. As the current Ipp drops, the size of the core can be reduced. The entire flyback transformer 12 is thus made compact. With the current Ipp lowered, power loss drops, and power saving is also obtained. When the number of layers of secondary winding of the flyback transformer 12 is increased to six or even to seven, the amplitude of the current Ipp is lowered. A compact and power-saving flyback transformer 12 results. The frequency of ringing is heightened in a high driving frequency region of the high generator circuit 10. These advantages are particularly pronounced in a frequency region of 70 kHz or higher.

Figure 4:
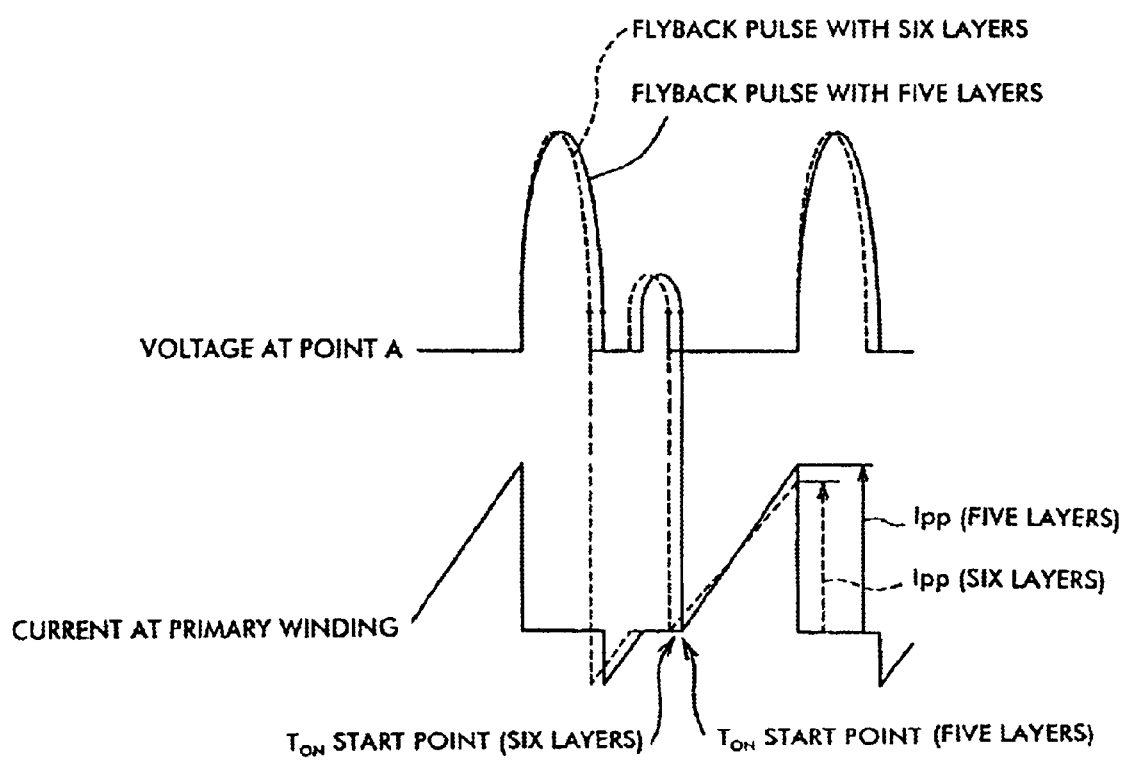
FIG. 4 is a waveform diagram showing the relationship between the start of $T_{ON}$ at the moment the pulse width of a flyback pulse is narrowed, and a flowing current.

The pulse width Tr of the flyback pulse is determined by the capacitance of the resonance capacitor 22, the inductance of the primary winding of the flyback transformer 12, and the distributed capacitance of the flyback transformer 12. In the case of the six layers of the secondary winding of the flyback transformer 12, the pulse width Tr of the flyback pulse becomes short because of a drop in the distributed capacitance in comparison to the five layers of the secondary winding of the flyback transformer 12. As shown in FIG. 4, the start of the ringing comes earlier. By adjusting the inductance Lp so that the FET 16 is turned on at the same point as that for the five layers of secondary winding, the gradient of the current waveform is decreased, and the height of the input current Ipp is lowered. A compact and power-saving design is thus implemented in the flyback transformer 12. By increasing the number of layers of secondary winding of the flyback transformer 12, the frequency of ringing is heightened, and the pulse width of the flyback pulse is shortened. The input current Ipp is decreased, and compact and power-saving design is thus implemented.

Figure 5:
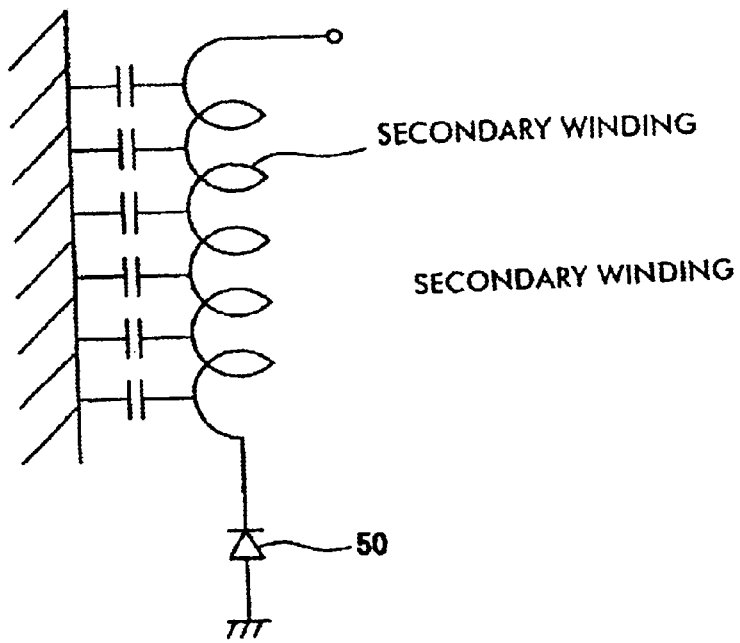
FIG. 5 is a circuit diagram showing a secondary winding of the flyback transformer employing a D0 diode method.
Figure 6:
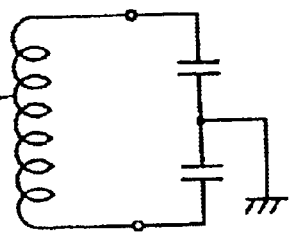
FIG. 6 is an equivalent circuit diagram of the secondary winding of the flyback transformer shown in FIG. 5.

Referring to FIG. 5, the cathode of a diode 50 is connected to one end of the secondary winding of the flyback transformer 12. In the D0 diode method with the anode of the diode 50 grounded, the one end of the secondary winding and the ground area are isolated in terms of alternating current. As shown in FIG. 5, distributed capacitance between the primary winding and the secondary winding is uniform in each segment of the windings. For this reason, the circuit shown in FIG. 5 is considered as a lumped-parameter network with the secondary winding having the same capacitance capacitors connected to both ends thereof as shown in FIG. 6. The center of the secondary winding thus serves as an alternating current zero point grounded in terms of alternating current. In this way, positive pulses and negative pulses are generated on both sides of the secondary winding.

In the flyback transformer 12, the center of the secondary winding serves as ground, and a single winding works as two windings with the center thereof serving as a neutral point. Specifically, the number of winding coils is halved, the distributed capacitance is reduced, and the resonance frequency is thus heightened.

In the flyback transformer 12 of the D0 diode method, the distributed capacitances between the primary winding and the secondary winding are uniform in each segment, but the separations between the windings and the ground area become different when the flyback transformer 12 is mounted. The distributed capacitances between the windings and the ground area are different, and in practice, the center of the secondary winding fails to coincide with the alternating current zero point. As shown in FIG. 7, the alternating current zero point is determined by a distance X1 from the mounting surface of the flyback transformer 12 to the top edge of the winding, a distance X2 from the mounting surface of the flyback transformer 12 to the bottom edge of the winding, and a winding width Y1. The alternating current zero point is upwardly offset from the center of the winding by Z1.

With an offset Z1 from the center of the winding, a positive pulse portion has a wider width as shown in FIG. 7, and the frequency of the resonance oscillation waveform is low. In contrast, a negative pulse portion has a narrower width, and the frequency of the resonance oscillation waveform is high. Resonance loss collectively determined by the geometry parameters X1, X2, Y1, Z1, etc. increases as the offset from the center of the winding becomes large.

The five layer secondary winding and the six layer secondary winding are compared in the flyback transformers 12 having 2500 or fewer number of turns of secondary winding coils. Given the same coil pitch in the secondary winding, the six layer secondary winding has a winding width Y2 smaller than a winding width Y1 of the five layer winding. Referring to FIG. 8, the distance X1 from the mounting surface to the top edge of the six layer flyback transformer 12 is shorter than that in the five layer flyback transformer 12. An offset Z2 of the alternating current zero point determined by geometry parameters X1, X2, Y2, and generated voltages in each of the primary winding and the secondary winding is lowered by a decrease in the winding width and a decrease in the winding height. The alternating current zero point approaches the center of the winding. As a result, the difference between the winding width of the positive pulse portion and the winding width of the negative pulse portion becomes small. The difference between the resonance frequency of the positive pulse and the resonance frequency of the negative pulse decreases. A design for tuning the positive pulse and the negative pulse is easily performed. In the entire flyback transformer 12, resonance loss is reduced, and power efficiency is improved.

When the number of layers of the secondary winding is increased, the distributed capacitance is reduced. The frequency of the ringing is increased, and the pulse width of the flyback pulse is narrowed. The start of the on time $T_{ON}$ of the FET 16 is hastened. A compact and power-saving design is implemented in the flyback transformer 12.

A compact and power-saving flyback transformer 12 is thus provided by increasing the number of layers of the secondary winding. In the D0 diode method, a compact and power-saving design is incorporated by placing the alternating current zero point closer to the center of the winding.

In accordance with the present invention, an increase in the number of layers of the secondary winding of the flyback transformer 12 reduces the distributed capacitance and improves the alternating current zero point in the D0 diode method. A compact and power-saving design is thus implemented in the flyback transformer.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A flyback transformer for use in a PWM controlled high voltage generator circuit, comprising a primary and a secondary winding, the secondary winding comprising a layer-wound secondary winding having a number of layers equal to or larger than six.

2. The flyback transformer of claim 1, further comprising a diode having an anode and a cathode, the cathode connected to one end of said secondary winding and the anode being grounded.

3. The flyback transformer of claim 2, wherein said flyback transformer is used in a PWM controlled high voltage generator circuit having an operation frequency of 70 kHz or higher.

4. The flyback transformer of claim 3, wherein the number of turns of said secondary winding is 2500 or smaller.

5. The flyback transformer of claim 2, wherein the number of turns of said secondary winding is 2500 or smaller.

6. The flyback transformer of claim 1, wherein said flyback transformer is used in a PWM controlled high voltage generator circuit having an operation frequency of 70 kHz or higher.

7. The flyback transformer of claim 6, wherein the number of turns of said secondary winding is 2500 or smaller.

8. The flyback transformer of claim 1, wherein the number of turns of said secondary winding is 2500 or smaller.

9. A method of making a flyback transformer for use in a PWM controlled high voltage generator circuit comprising providing a primary winding and a secondary winding, and forming the secondary winding in a plurality of wound layers wherein the number of layers is equal to or larger than 6.

10. The method of claim 9, further comprising providing a diode with a cathode and an anode, the cathode connected to one end of said secondary winding and the anode being grounded.

11. The method of claim 10, wherein said flyback transformer is used in a PWM controlled high voltage generator circuit having an operation frequency of 70 kHz or higher.

12. The method of claim 11, further comprising winding the secondary winding with a number of turns of 2500 or smaller.

13. The method of claim 10, further comprising winding the secondary winding with a number of turns of 2500 or smaller.

14. The method of claim 9, wherein said flyback transformer is used in a PWM controlled high voltage generator circuit having an operation frequency of 70 kHz or higher.

15. The method of claim 14, further comprising winding the secondary winding with a number of turns of 2500 or smaller.

16. The method of claim 9, further comprising winding the secondary winding with a number of turns of 2500 or smaller.

* * * * *